March 24, 1970   C. MICHELSON   3,502,404
MOVIE FILM WITH MULTI-SEQUENCE STAGGERED IMAGES
Filed Feb. 3, 1967

Inventor
CHARLES MICHELSON

United States Patent Office

3,502,404
Patented Mar. 24, 1970

3,502,404
MOVIE FILM WITH MULTI-SEQUENCE STAGGERED IMAGES
Charles Michelson, Paris, France, assignor to Teverama S.A., Lausanne, Vaud, Switzerland, a company of Switzerland
Filed Feb. 3, 1967, Ser. No. 613,811
Claims priority, application France, Feb. 25, 1966, 51,218
Int. Cl. G03c 1/76; G03b 31/00, 21/50
U.S. Cl. 352—239                                6 Claims

ABSTRACT OF THE DISCLOSURE

A motion picture film bearing several intercalated image sequences with images belonging to the same sequence designed to be projected in succession. The images are aligned in a row which does not extend parallel to the longitudinal axis of the film but at a small angle of inclination with respect to the axis, the successive images of a sequence having a slight mutual offset in the transverse direction besides being longitudinally spaced. A sound track is provided for each sequence.

BACKGROUND OF THE INVENTION

The present invention relates to a film of the kind comprising intercalated cinematographic images which are distributed in such manner that the images belonging to one sequence and intended to be projected successively are not adjacent, but are separated by an interval containing one or more images belonging to one or more different sequences. This invention is concerned more specifically with a film of this kind having several longitudinal rows of intercalated images, distributed over the width of the film, as described in my co-pending application Ser. No. 475,204 filed July 27, 1965, now abandoned.

The use of such a film in a projection apparatus requires the operation of a means suitable for permitting the rapid change from one row of images to the other after the images of the first row have peen projected. This arraangement is generally complex and delicate.

The present invention enables this arrangement to be dispensed with, as a result of a continuous progression from one series of images to the next.

SUMMARY OF THE INVENTION

According to the present invention, the images belonging to a same sequqence and adapted to be projected in succession are not disposed in strict alignment parallel to the axis of the film, but with a slight mutual offset in the transverse direction, this mutual offset being such that, at the end of one series of images, the starting position for the following series is reached and so on.

Such a film is intended to be projected by a reciprocatory movement with progressive sliding in the transverse direction of the film with respect to the optical projection system.

DESCRIPTION OF THE PREFERRED EMBODIMENT

Figures 1, 2, 3:
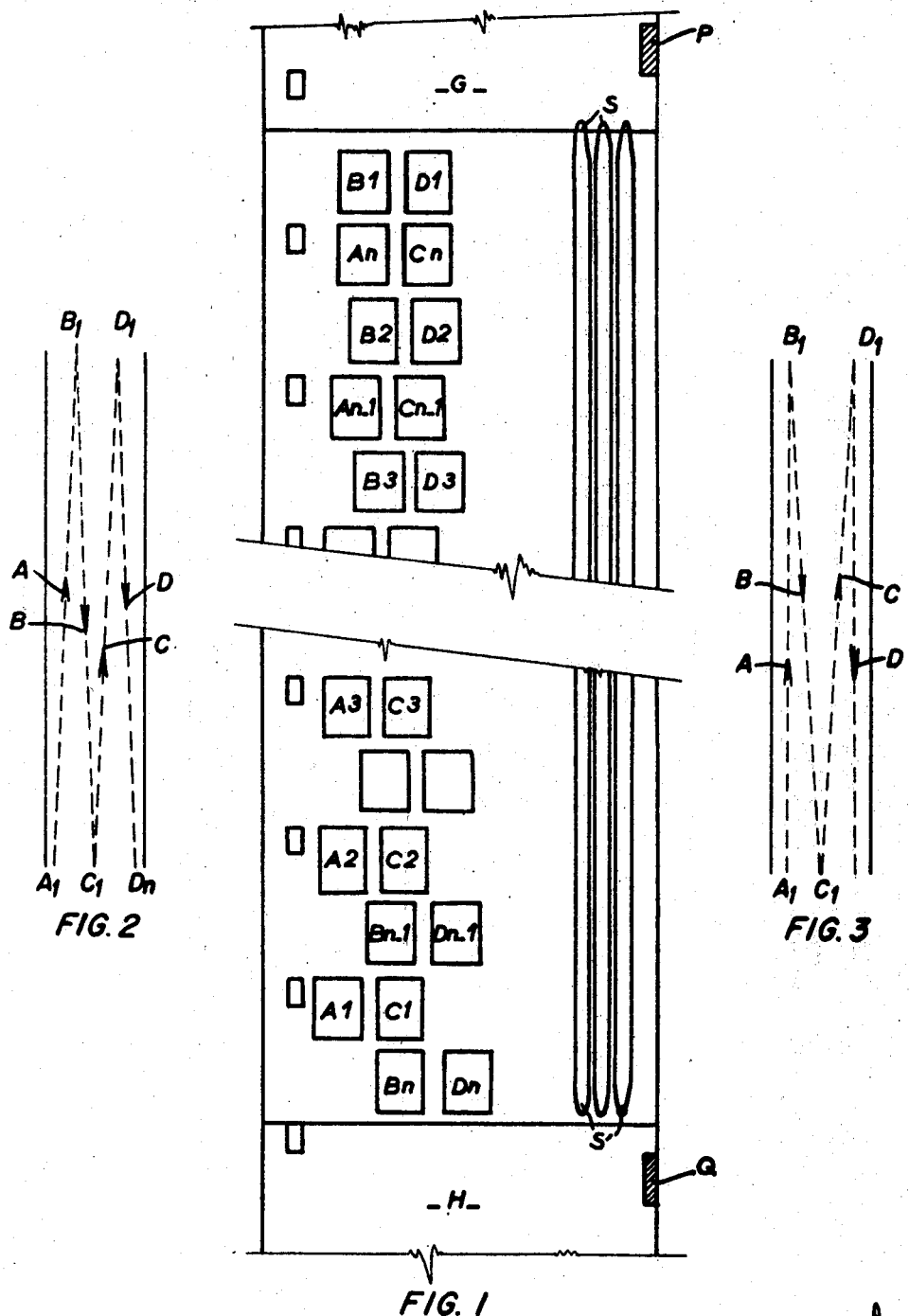
FIGURE 1 represents diagrammatically a film in accordance with the present invention.
FIGURES 2 and 3 are sketches relating to two alternative image distributions.

This film has several intercalated image sequences or series A, B, C, D, on as many rows going to and fro. At the end of each image series, the direction of unwinding of the film should be reversed, and for this purpose, there is provided at P and Q a lateral notch, an electric contact or the like, which permits the detection of an end of a sequence and the initiation of a reversing switch for the projection apparatus, in a manner which is known per se and which does not come within the scope of the present invention.

According to the invention, and as will be clearly seen from FIGS. 1 and 2, the locus of the center points of the image frames of the various sequences is in the form of a broken line in the general shape of a W (in the case of 4 sequences as illustrated) with each branch being a straight line inclined with respect to the axis of the film the successive images such as A1, A2, A3 . . . A$n$ are not in parallel alignment with the axis of the film, as is usual, but are slightly offset transversely by the same quantity or pitch, which is determined by taking into account the number $n$ of images and the width of the latter, so that, at the last image A$n$, the film is practically in a starting position for the following series B. As for the series A, the images B1, B2, B3 . . . B$n$ of the series B will also be offset transversely, so that the last image B$n$ comes in immediate proximity with the first image C1 of the following series C, and so on. The total transverse offset carried out during an outward and return travel will be equal to the transverse interval which separates two adjacent images, such as A1 and C1.

Although it seems preferable to have the same transverse staggering or off-setting pitch for all the series of images as illustrated in FIGS. 1 and 2, so that the relative transverse displacement of the film and the optical projection system is uniform and continuous throughout the projection, this is not essential. It would thus be possible as shown in FIG. 3 to have an M-shaped locus of center points with a zero pitch for one series, say A or D—that—is to say, the images can be aligned longitudinally as on ordinary films—but it will then be necessary to double the value of the transverse pitch for the adjacent series, say B or C, in order to achieve eventually the required total offset such as B1-C1.

It is obvious that with the completion of each travel in one direction or the other, it is appropriate to shift the film longitudinally with respect to the optical projection system by the height of one image in order to pass from the last image A$n$ to the first image B1, and this can be carried out automatically at the time of reversing the winding direction, by means of end extensions G and H or phase-shift initiators, in accordance with the particulars given in my co-pending application Ser. No. 584,160 filed Oct. 4, 1966.

The ends of the juxtaposed sound tracks which corresponds respectively to the various image series are shown diagrammatically at S and S'.

It is necessary to note that, because of its actual design, the film must have an invariable length so that sequence of the image series is effected correctly with a well-defined off-setting with each outward and return travel. However, if it were necessary to use slight differences in the length of the film, it will be possible to ensure the adjustment by acting on the length of the end initiators G or H.

What is claimed is:

1. A cinematograph film of the reciprocable, multi-sequence, intercalated image type bearing a plurality of distinct consecutive rows of image frames succeeding each other in each row from a first end image to a last end image in a same direction of progression along the film, the directions of progression of image frames in the two consecutive rows being reverse, the locus of the image frame center points of said rows being a broken line formed of consecutive oppositely oriented, finite segments at an angle with each other.

2. Film as claimed in claim 1, comprising a number of consecutive rows of image frames in excess of two.

3. Film as claimed in claim 2, wherein said first end image of one row and said last end image of the next consecutive, oppositely oriented row, are laterally offset with respect to each other by substantially an image width.

4. Film as claimed in claim 3, wherein said consecutive, oppositely oriented segments have substantially equal but opposite inclinations with respect to the longitudinal axis of the film.

5. Film as claimed in claim 3, wherein said consecutive, oppositely oriented segments have different inclinations with respect to the longitudinal axis of the film.

6. Film as claimed in claim 5, wherein one of said consecutive, oppositely oriented segments is susbtantially parallel to said longitudinal axis.

References Cited

UNITED STATES PATENTS

| 1,557,727 | 10/1925 | Reynolds | 352—101 X |
| 2,590,956 | 4/1952 | Gille | 352—239 X |
| 3,341,276 | 9/1967 | Prater | 352—233 X |
| 1,698,106 | 1/1929 | Owens | 352—92 X |

FOREIGN PATENTS

| 9,262 | 1909 | Great Britain. |
| 21,891 | 1909 | Great Britain. |

NORTON ANSHER, Primary Examiner

MONROE H. HAYES, Assistant Examiner

U.S. Cl. X.R.

352—37, 83, 92